Sept. 25, 1962 P. S. BAROTZ 3,055,392
FAUCET ATTACHMENT FOR DISHWASHERS AND THE LIKE
Filed Dec. 21, 1959 2 Sheets-Sheet 1
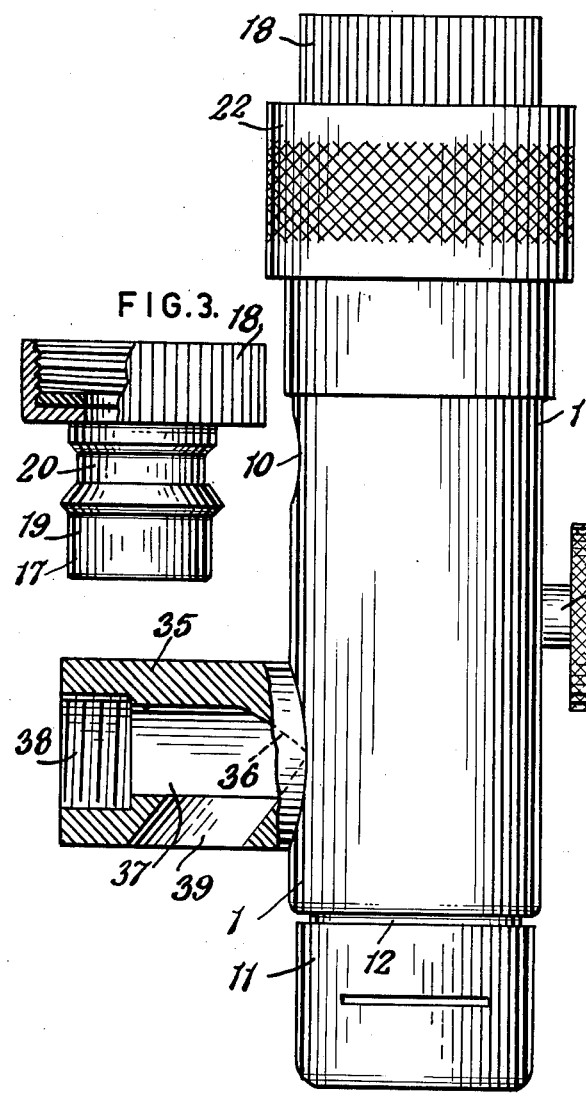
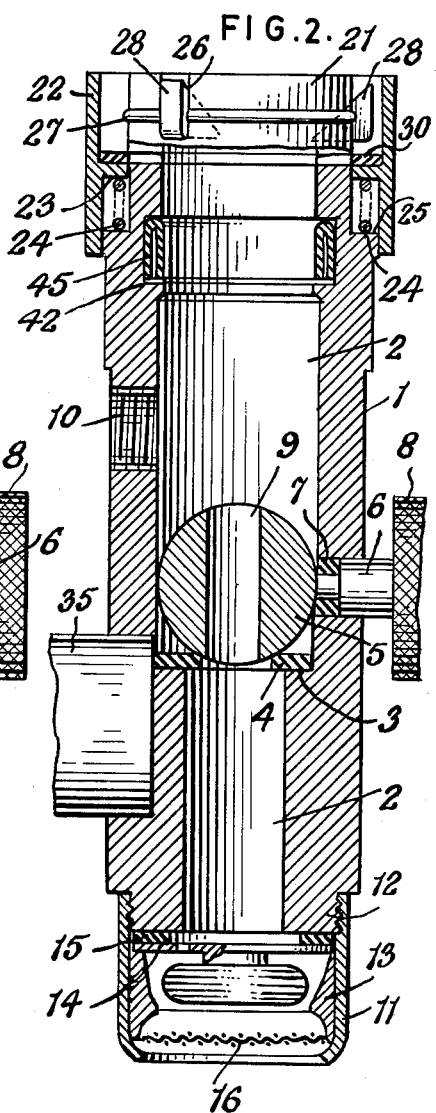
INVENTOR
Peter S. Barotz
BY
ATTORNEY Sept. 25, 1962 P. S. BAROTZ 3,055,392
FAUCET ATTACHMENT FOR DISHWASHERS AND THE LIKE
Filed Dec. 21, 1959 2 Sheets-Sheet 2
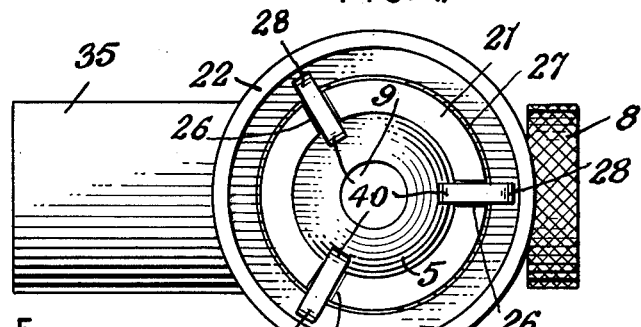
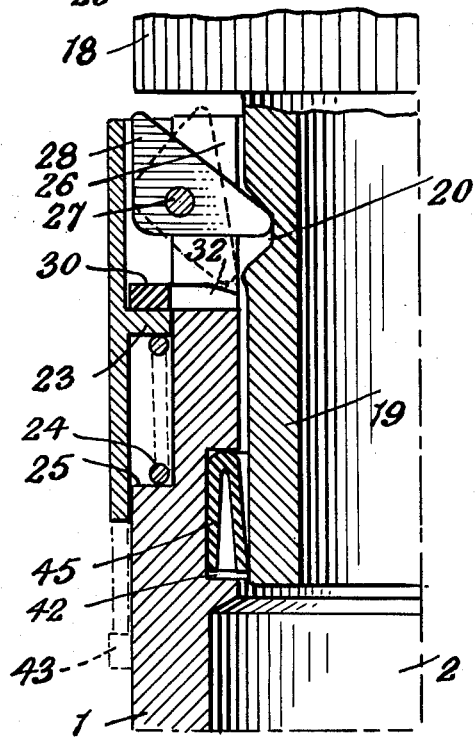
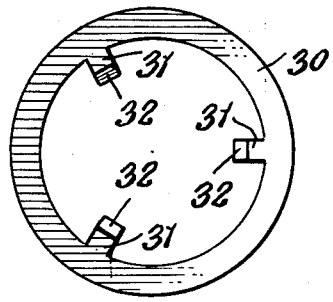
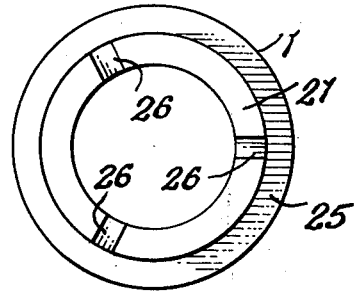
INVENTOR
Peter S. Barotz
BY
ATTORNEY United States Patent Office 3,055,392
Patented Sept. 25, 1962

3,055,392
FAUCET ATTACHMENT FOR DISHWASHERS
AND THE LIKE
Peter S. Barotz, Brooklyn, N.Y., assignor to P-G Products Mfg. Co. Inc., New York, N.Y., a corporation of New York
Filed Dec. 21, 1959, Ser. No. 860,891
6 Claims. (Cl. 137—562)

This invention relates to attachments or fittings for water faucets or other water outlets, and more particularly to a device by which inlet and outlet hoses or other conduits are coupled to an appliance such as a dishwasher.

It is one of the objects of the invention to provide a device of this character which can be quickly attached to or detached from a water faucet by means of a novel form of connecting device.

It is an object of the invention to provide a device which, when coupled to a faucet or other water outlet, will permit the faucet to which it is applied to function in its normal manner and which will, when required, enable water to be directed from the faucet through a hose or conduit leading to the dishwasher or other appliance, and which will also permit water drained from the dishwasher to be directed into the sink or basin over which the faucet is positioned.

It is another object of the invention to provide means, in a device of this character, by which water pressure built up by the dishwashing operation, can be relieved prior to disconnecting the fitting from the faucet, thereby preventing water spurt which often occurs when disconnection of the water hose takes place.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is an elevational view of the improved fitting;

FIG. 2 is a vertical sectional view through the same, with some of the elements broken away to disclose construction;

FIG. 3 is an elevational view of a connection device or nipple, with some parts broken away, and other parts in section to disclose construction;

FIG. 4 is a top plan view of the device;

FIG. 5 is a perspective view of one of the cams;

FIG. 6 is an enlarged sectional view of a portion of the fitting;

FIG. 7 is a top plan view of the splined ring, and

FIG. 8 is a top plan view of the body of the fitting.

The improved fitting is particularly adapted for use in connection with dishwashers, but its features are such as to permit its use on various other appliances. Referring to the drawings, 1 indicates the body of the fitting and which, in the form shown, is of cylindrical shape and is provided with the axial passage 2 extending from one end of the body to its opposite end. Passage 2 is formed with an annular shoulder 3, serving as a seat for a washer 4 against which a ball valve 5 is operative. Said valve 5 is secured on a stem 6 surrounded by a packing 7, and the stem 6 extends through the wall of the body 1. The portion of the stem that is located on the outside of the body 1 carries a knurled disk 8 by means of which the valve 5 may be positioned, on rotative movement of the valve, to either align its central passage 9 with the passage 2 of the body or else to an angle of ninety degrees to thereby cause the valve to close the passage. When the valve is turned to the latter position, water flowing into the passage from above the valve and from a faucet or other water outlet connected at the top of the fitting, will flow through an internally-threaded outlet 10 extending through the side wall of the body 1. This outlet 10 is connected to a hose or other conduit to the appliance, such as a dishwasher, and when the water is turned on and the valve 5 is closed as above explained, the water will flow out through opening 10 and into the hose or conduit leading therefrom to the dishwasher. When the valve is closed as above described, the water pressure against the ball valve 5 will tend to seal it against the washer 4. When the valve is in its open position, or that shown in FIG. 2, wherein the valve passage 9 is aligned with the body passage 2, the water from the faucet will flow out of the lower end of the fitting.

In the form shown, the lower end of the body 1 is provided with an aerator of known construction, the same consisting of a slotted cap member 11 threadably fitted on the screw-threaded end 12 of the body 1. The cap 11 contains a bushing 13, operative against a mushroom-headed, perforated disk 14 having a washer 15 interposed between it and the end of the body 1. A filter or strainer 16 is confined in the cap member 11.

At the opposite end of the body 1 is provided means for detachably coupling the fitting to a tubular connector or nipple 17 that is threadably fitted on the end of the faucet or other water outlet. In the form shown, and the connector may be made in other forms, the nipple 17 is provided with an internally-threaded cup portion 18 for fitment on the external threads at the end of the faucet. Extending from the cup portion 18 is a shank 19 formed with a peripheral groove 20.

The upper end 21 of the body 1 is reduced in diameter and slidably extending around this part of the body is a sleeve 22, provided with an internal annular flange 23. A spring 24 is confined between said flange 23 and an annular ledge 25 formed on the body 1. The end 21 of the body 1 is formed with a plurality of radial slots 26, three in number being shown. A wire ring 27 encircles the end portion 21 of the body and seats in a circumferential groove formed therein. Pivotally mounted on the wire ring 27 are three cams 28, one of which is clearly shown in FIG. 5. Each of these cams is substantially triangular in shape and is provided with a hole 29 through which the wire ring 27 passes to mount the cams in the three radial slots 26 as shown in FIG. 4.

Located under the cams 28 is a spline ring 30, formed with the radially-extending splines or lugs 31, tapered at their inner ends as shown at 32 to provide clearance for the cams 28 during their pivotal movement. The splines or lugs 31 fit in the slots 26, and normally the ring 30 constantly applies an upward pressure against the cams. In the drawings the ring 30 is shown spaced below the cams with the sleeve 22 slightly depressed or retracted, for the purpose of clearly showing the structure, but in actual practice the ring 30 is constantly spring-biased against the cams by the spring 24.

At 35 is shown a nipple fitted in the side wall of the body 1, said nipple being closed at its rear end as indicated at 36 so that it does not communicate with the interior of the body 1. Said nipple 35 has an interior bore 37 which is threaded as shown at 38 for the reception of a threaded coupling on a drain pipe or hose leading from the dishwasher. An an alternative, the nipple 35 might be externally threaded. Extending through the wall of the nipple 35 is a drain outlet 39.

From the foregoing, the operation of the improved fitting will be readily apparent. A connection nipple, such as that shown at 17 in FIG. 3, is threadably fitted on the end of a faucet or other water outlet that is located over a sink. The fitting is coupled to the nipple 17 by pushing the open end 21 over the shank of the nipple. As the shank 19 enters into the body 1, it encounters the nose portions 40 of the cams 28, which nose portions normally project into the upper portion of the central passage 2, as clearly seen in FIG. 4. The contact of the end of the shank 19 with these portions of the cams causes the cams to be pivotally moved in opposition to the pressure of the spring 24, to the position shown in dotted lines in FIG. 6, so that the shank of the nipple can continue downwardly for full insertion into the passage 1. When the circumferential groove 20 in the shank of the nipple reaches the point shown in FIG. 6 where the groove 20 registers with the ends or noses of the cams, the cams will be pivotally moved to the full line position of FIG. 6 to thereby engage with the groove 20, in which engagement the cams are maintained by the upward pressure of the spring 24 against the splined ring 30. While the sleeve 22 is in its raised position, or slightly higher than that in which it is shown in FIGS. 1 and 6, it will prevent counter-clockwise pivotal movement of the cams 28, so that in the absence of any applied downward pressure on the sleeve 22, the coupling of the fitting with the nipple 17 will be maintained.

When it is desired to remove the fitting from its attachment to the nipple 17, it is merely necessary to retract or draw downwardly, the sleeve 22 against the pressure of the spring 24, and the sleeve 22 will, in such retracted position, indicated by the dotted lines at the left in FIG. 6, permit counter-clockwise pivotal movement of the cams 28 and allow the fitting to be pulled away from the nipple 17. A U-shaped packing 45 is provided in a groove 42 formed inside of the body 1 and the packing contacts with the shank 19 of the nipple to afford a seal around the shank when the nipple is connected to the fitting.

In connecting the fitting to a dishwasher or possibly to some other appliance, the side outlet 10 is connected to the inlet hose of the appliance and the nipple shown at 35 is connected to the drain hose of the appliance. When the dishwasher is in use, the ball valve will be turned to the off position, or that in which its passage 9 is at right angles to the position shown in FIG. 2, so that hot water streaming from the faucet and into the fitting will flow out through the side outlet 10, through the hose connected thereto, and into the dishwasher. When the dishwashing cycle has been completed and the water is being pumped out, such water will proceed through the outlet hose of the dishwasher, to the nipple 35 to which such hose is connected, and out through the outlet 39 to flow into the sink and into the waste pipe thereof.

When the dishwasher is not in use, the ball valve 5 is turned to the open position shown in FIG. 2 in which its passage 9 is aligned with the passage 2 through the body 1, whereupon any water flowing from the faucet to which the fitting is connected will flow out of the lower end of the fitting and through the aerator there attached.

The ball valve 5 has another purpose. After the dishwasher is used, under normal operating conditions, water pressure is built up in the line and to such an extent that when the fitting is detached from the faucet the water is likely to spurt out in all directions. The ball valve 5 will, if turned to the on position or that shown in FIG. 2, before detaching the fitting from the faucet, act as a relief valve, and will serve to relieve the pressure in the line, thus avoiding the high pressure spurt.

While I have herein stated that the fitting is particularly adapted for use in connection with dishwashers, it is apparent that it can be used for attachment to other appliances. Also, the quick-coupling construction at the top end of the device can be used in connection with other fittings wherever a coupling of this nature for attachment to a faucet or other water outlet is required.

Having described a single embodiment of the invention, it is obvious that the same is not to be restricted thereto, but is broad enough to cover all structures coming within the scope of the annexed claims.

What I claim is:

1. A faucet attachment having a body provided with an axial passage, slots provided in one end of the body, pivotal triangulated cam members mounted in the slots and having their extremities projecting into said passage, a spring-pressed sleeve arranged around the body, said sleeve having an internal annular seat, a ring carried within the sleeve on the annular seat thereof and resiliently urged against the cams to thereby normally maintain the cams with their rear extremities projected into the passage, means for slidably but non-rotatably maintaining the ring relatively to the body, said cams being capable of pivotal movement in one direction under the pressure of a grooved shank of a coupling member entering the passage and being restrained against pivotal movement in the opposite direction by the sleeve when the sleeve is in an advanced position, the retraction of the sleeve permitting movement of the cams in said opposite direction, thereby permitting disengagement of said cams from the groove in said shank.

2. A faucet attachment, as provided for in claim 1, wherein the slots extending radially in one end of the body, the ring having radially-extending lugs extended into said slots, and an encircling wire annulus extending around the body near its end and on which the cams are pivoted.

3. An attachment of the character described comprising, a body member of cylindrical form having an inlet end and an outlet end, an axial passage extending through said body member from end to end, one end of the body member having a plurality of radial slots, a ring having lugs entering the slots, the body member having an encircling annulus of wire fitted in a groove in the body member near its inlet end and extending around the slots, triangular cams mounted in the slots and pivotal on the wire annulus, said cams having forward portions normally projecting into the axial passage, a sleeve axially slidable on the body member, said sleeve having a seat against which the annular ring is rested, and spring means for urging the ring against the cams to thereby resiliently maintain the cams with their forward portions in said projected position but permitting pivotal movement of the cams in one direction.

4. An attachment as provided for in claim 3, wherein the body member has a ball valve located between its inlet and outlet ends, an outlet opening in the body member between the valve and the outlet end, and means on the body member for engaging with one end of the drain hose leading from a dishwasher and permitting the flow of water into a sink above which a faucet to which the attachment is located, is situated.

5. An attachment of the character described comprising, a body member having an axial passage, a plurality of cams mounted at one end of the body member, a sleeve arranged around said end of the body member and slidable thereon, an annular seat inside of the sleeve and positioned between the sleeve and the outside of the body member, means interposed between the cams and the seat for applying resilient pressure on the cams to thereby maintain the cams with portions of them projecting into the axial passage, said means comprising a ring carried by the seat and movable axially of the body, means on the ring for engagement with the body to maintain the ring against rotative movement relatively to the body and spring means operative on the sleeve to move the sleeve and the pressure-applying means toward the cams.

6. An attachment of the character described comprising, a tubular body having a reduced-diameter forward end portion, a sleeve encircling said forward end portions and defining an annular space between it and said end portion, the sleeve having an annular flange located in said annular space, a ring resting against one side of said flange, an annular ledge provided on the body, a coil spring arranged between said ledge and the second side of the flange, the forward end portion of the body having a plurality of radial slots, the ring having lugs entering said slots and permitting the ring to have axial sliding movement but maintaining it against rotative movement relatively to the body, a cam pivotally mounted in each of the slots, the ring being located between the cams and one side of the annular flange whereby the ring is normally moved by the sleeve into resilient contact with the cams by the biasing pressure of the coil spring.

References Cited in the file of this patent

UNITED STATES PATENTS

| | | |
|---|---|---|
| 1,291,631 | Pearsall | Jan. 14, 1919 |
| 1,324,654 | Ferguson | Dec. 9, 1919 |
| 1,505,492 | Reddig | Aug. 19, 1924 |
| 1,744,305 | Gannaway | Jan. 21, 1930 |
| 2,012,834 | Snyder | Aug. 27, 1935 |
| 2,094,161 | Paddock | Sept. 28, 1937 |
| 2,409,650 | Wiggins | Oct. 22, 1946 |
| 2,698,731 | Koehler | Jan. 4, 1955 |

FOREIGN PATENTS

| | | |
|---|---|---|
| 505,351 | Italy | Dec. 16, 1954 |